1

United States Patent
Le et al.

(10) Patent No.: US 8,769,669 B2
(45) Date of Patent: Jul. 1, 2014

(54) METHOD AND APPARATUS TO AUTHENTICATE A USER TO A MOBILE DEVICE USING MNEMONIC BASED DIGITAL SIGNATURES

(75) Inventors: Zhengyi Le, Redwood City, CA (US); Xinwen Zhang, San Jose, CA (US); John Waclawsky, Bartlett, IL (US); Jiwei Wei, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 142 days.

(21) Appl. No.: 13/366,011

(22) Filed: Feb. 3, 2012

(65) Prior Publication Data

US 2013/0205387 A1 Aug. 8, 2013

(51) Int. Cl.
G06F 21/00 (2013.01)
G06F 21/36 (2013.01)
H04W 12/06 (2009.01)

(52) U.S. Cl.
CPC ............... *G06F 21/36* (2013.01); *H04W 12/06* (2013.01)
USPC .......................................................... 726/19

(58) Field of Classification Search
CPC . G06F 21/36; G06F 2221/2133; H04W 12/06
USPC .......................................................... 726/19
See application file for complete search history.

(56) References Cited

U.S. PATENT DOCUMENTS

| | | | |
|---|---|---|---|
| 5,559,961 A | 9/1996 | Blonder | |
| 7,599,525 B2 | 10/2009 | Lin et al. | |
| 7,791,156 B2 | 9/2010 | Chiba | |
| 7,907,838 B2 | 3/2011 | Nasiri et al. | |
| 8,024,775 B2 | 9/2011 | Xu et al. | |
| 2001/0037468 A1 | 11/2001 | Gaddis | |
| 2002/0129283 A1* | 9/2002 | Bates et al. | 713/202 |
| 2004/0054929 A1 | 3/2004 | Serpa | |

(Continued)

OTHER PUBLICATIONS

"Named Data Networking," http://named-data.org, downloaded from the Internet Feb. 3, 2012, 2 pages.

(Continued)

*Primary Examiner* — Hadi Armouche
*Assistant Examiner* — Dao Ho
(74) *Attorney, Agent, or Firm* — Conley Rose, P.C.; Grant Rodolph; Rayhao A. Chung

(57) ABSTRACT

A user device comprising a processor configured to enable a mnemonic based digital signature scheme for user authentication that is based on a combination of one or more secrets and one or more actions implemented on the user device and associated with the secrets, and a device input system coupled to the processor and configured to detect the actions implemented on the user device. Also disclosed is an apparatus comprising a processor configured to implement a mnemonic based digital signature for authenticating a user, a device input system configured to enable the mnemonic based digital signature, and a memory unit configured to store input data that is used to recognize the mnemonic based digital signature, wherein the mnemonic based digital signature comprises a secret, an action associated with the secret and implemented using the device input system, and a cue associated with the action.

24 Claims, 6 Drawing Sheets

(56) References Cited

U.S. PATENT DOCUMENTS

| | | |
|---|---|---|
| 2008/0020733 A1 | 1/2008 | Wassingbo |
| 2008/0022365 A1 | 1/2008 | Chae et al. |
| 2008/0109657 A1* | 5/2008 | Bajaj et al. .................. 713/168 |
| 2009/0303204 A1 | 12/2009 | Nasiri et al. |
| 2010/0043062 A1 | 2/2010 | Alexander et al. |
| 2010/0186074 A1 | 7/2010 | Stavrou et al. |
| 2010/0197352 A1 | 8/2010 | Runstedler et al. |
| 2011/0053685 A1 | 3/2011 | Kim et al. |
| 2011/0145587 A1* | 6/2011 | Park ............................. 713/182 |

OTHER PUBLICATIONS

"Advanced Crypto Software Collection," http://acsc.cs.utexas.edu/, downloaded from the Internet Feb. 3, 2012, 3 pages.

Foreign Communication From a Counterpart Application, PCT Application PCT/US2013/024466, International Search Report dated Jul. 15, 2013, 4 pages.

Foreign Communication From a Counterpart Application, PCT Application PCT/US2013/024466, Written Opinion dated Jul. 15, 2013, 4 pages.

* cited by examiner

US 8,769,669 B2

METHOD AND APPARATUS TO AUTHENTICATE A USER TO A MOBILE DEVICE USING MNEMONIC BASED DIGITAL SIGNATURES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A password is a secret word or string of arbitrary characters (e.g., letter, digits, symbols, etc.) that is used for authentication to prove identity or gain access to a resource. For example, an access code is a type of password. The password is typically assigned to a person and is kept secret from those who are not allowed access or that are assigned their own different passwords. User names and passwords are commonly used by users during a log in process that controls access to protected computer operating systems, mobile phones, cable Television (TV) decoders, automated teller machines (ATMs), or any similar systems. A typical computer user may require passwords for many purposes, such as logging into computer accounts, retrieving email from servers, accessing programs, databases, networks, or web sites, reading subscribed online content (e.g., online newspapers), or accessing any other secured or restricted systems.

There is no need for passwords to be actual or correct words. Typically, passwords are text based. Passwords that are not actual text may be harder to guess, which can be desirable. The terms "word" or "words" are used herein to representing any text string. Some passwords may be long and formed from multiple words and may be referred to as passphrases. The term passcode is also sometimes used, e.g., when the secret information contains numeric text. For examples, passcodes include personal identification numbers (PINs) commonly used for ATM access. In many cases, text based security words or codes are generally short enough to be easily memorized and typed. Such words also have disadvantages, e.g., in comparison to authentication systems relying on cryptographic protocols that are more difficult to circumvent, in that text based security methods may be stolen, spoofed, forgotten, etc.

SUMMARY

In an embodiment, the disclosure includes a user device comprising a processor configured to enable a digital signature scheme based on a mnemonic-aided secret for user authentication that uses a combination of one or more secrets and one or more actions implemented on the user device and associated with the secrets, and a device input system coupled to the processor and configured to detect the actions implemented on the user device, wherein the mnemonic-aided secret is a sensory based mnemonic.

In another embodiment, the disclosure includes an apparatus comprising a processor configured to implement a digital signature scheme based on a mnemonic-aided secret for authenticating a user, a device input system configured to enable the digital signature scheme, and a memory unit configured to store input data that is used to recognize the digital signature scheme, wherein the digital signature scheme comprises a secret, an action associated with the secret and implemented using the device input system, and a cue associated with the action.

In a yet another embodiment, the disclosure includes a method to enable a digital signature based on a mnemonic-aided secret for user authentication on a device, comprising defining a user secret for the digital signature scheme, defining one or more actions for the digital signature scheme that are to be implemented on the device for user authentication and associated with at least one of the user and the device, and defining one or more device triggers for the digital signature scheme that are associated with the actions, generating a digital signature using the defined secret, actions, and triggers, storing the generated digital signature in memory, and training the device to recognize a successful digital signature operation by the user that matches the stored digital signature to authenticate the user.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
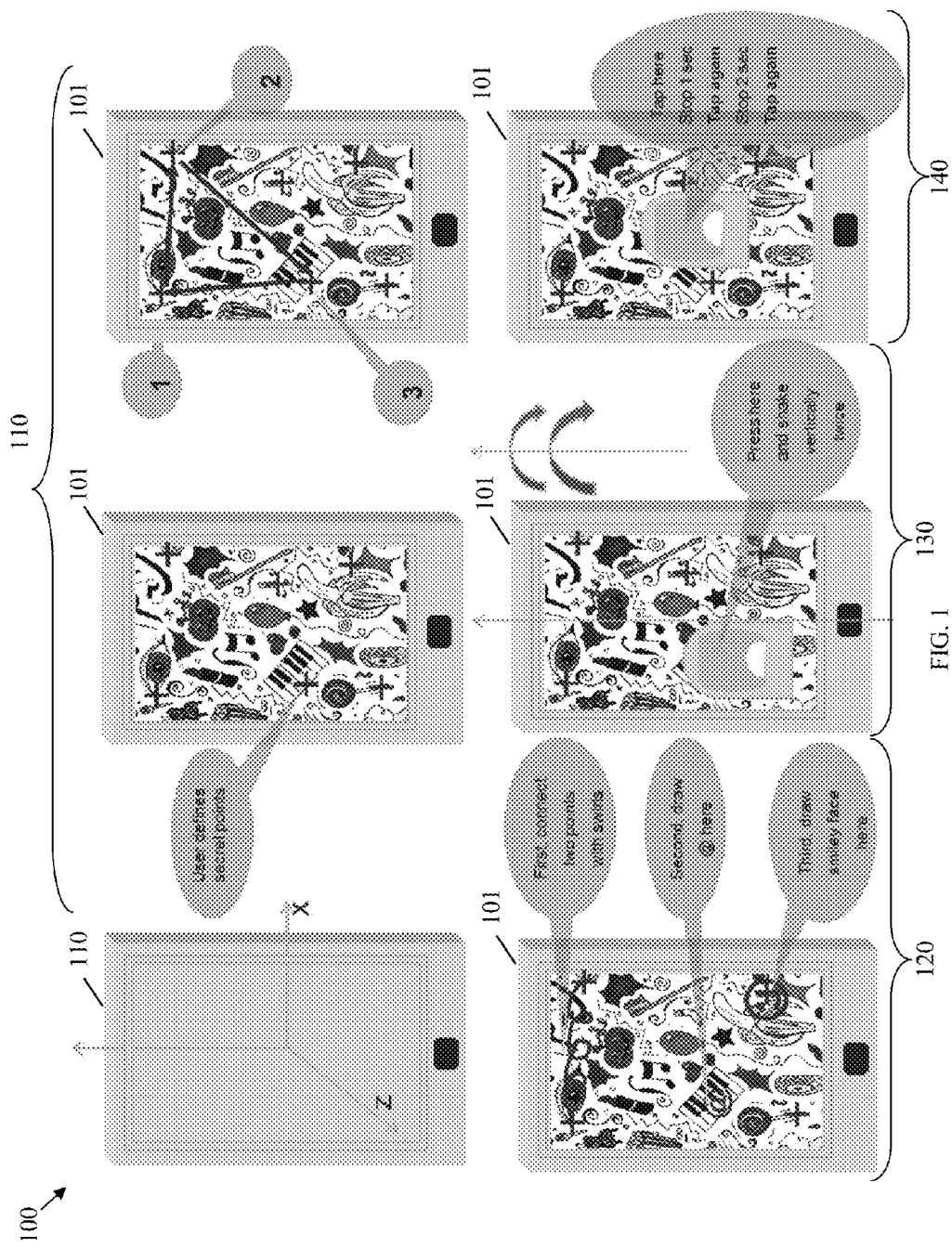
FIG. 1 is a schematic diagram of embodiments of a plurality of digital signature schemes based on a mnemonic-aided secret.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typical password based authentication methods, e.g., such as for accessing secured electronic based computer or other systems, may involve troublesome tradeoffs between security and convenience (or usability) for users. The passwords may be vulnerable to attacks, mal ware, keyboard sniffers, and/or glances by bystanders. Password attacks may include guessing, using a dictionary, brute-force cracking, key-logging, shoulder-surfing, social engineering attacks, and other types of attacks. Typically, the more convenient (or simpler) a password format is for a user to remember, the easier it may be for an attacker to guess or obtain the password and hence jeopardize the system or the user.

Passwords that are more difficult to remember may also reduce the security of the password protected system since users may need to write down (e.g., on a notepad) or electronically store (e.g., in a password list file) such passwords to recall the passwords upon need. The users may also need frequent password resets that may diminish system security and/or may be more likely to reuse the same passwords (e.g., without periodical password changes). The more complex passwords may also be less desirable since users may need longer time to input such passwords or may get locked out of the system after having multiple wrong inputs (and hence require a password reset). In some cases, a user may have many complex passwords, which may become confusing and/or annoying to the user, who may then avoid such strong security due to inconvenience.

Requiring users to remember longer and/or more complicated passwords, such as passwords comprised of combinations of uppercase and lowercase characters, at least one or more digits, and/or at least one or more special symbols, may be similar to asking the users to remember a sequence of arbitrary or random bits. It may be difficult for the users to remember and consistently input such passwords correctly. Enforcement of techniques such as including capital letters may also make remembering passwords more difficult and only provide a relatively small gain in security. For example, the requirement to include capital letters in passwords may be slightly harder to crack. For example, cracking an about seven-letters password may be only about 168 times harder to crack if the user simply capitalizes one of the letters.

Disclosed herein is a system and method for providing improved security for user authentication and system access using a digital signature scheme based on a mnemonic-aided secret without reducing convenience or usability to system users. The digital signature scheme may use a mnemonic approach, which is a learning technique that aids and/or train a memory of a user, a user device, or both for a digital signature recognition and hence user authentication (and access). A digital signature may be a mathematical scheme for demonstrating the authenticity of digital or electronic data or for authenticating access to a device, such as a user access. A digital signature scheme based on a mnemonic-aided secret may use any combination of secret knowledge and/or actions by a user of a device that may be used to authenticate the user with the device and hence grant the user access to the device.

The digital signature scheme based on a mnemonic-aided secret may comprise a secret knowledge, such as an image, graphic, and/or text, also referred to herein as a "secret". The secret may be assisted by a spatial, temporal, motional, visual, auditory, and/or tactile action. The digital signature scheme may also use a cue or trigger associated with the secret and the action, as described below. The secret, action, and trigger may be known to the user and may not be shared with unauthorized users of the device. The digital signature scheme may also change as a result of changes in time, date, and/or location of the device. The device may be a handheld device, personal device, portable device, mobile device, or any other type of user computer/communication device.

Typically, handheld or user devices may be equipped with multiple-axis (multiple-dimension) input systems, such as a display, a keypad, a touch screen, an accelerometer, a gyroscopic sensor, a Global Positioning System (GPS), a timer, a microphone, and/or a wireless interface (e.g., a Wireless Fidelity (WiFi) connection). The mnemonic based digital signature scheme may use the sensory or input data from the input systems to define a set of actions and a space of action vectors. The sensory/input data obtained may also be used in the digital signature scheme to recognize user defined signatures and hence identify and authenticate a user. The defined signature may be recognized by matching the detected actions by the user to predefined actions, e.g., in the memory of the device. A device user may define signature activity and train the system/device to improve the recognition precision. For instance, a mnemonic may be made available to a user (e.g., via display, vibration, tone, and/or other output signal) to improve the recognition precision of the x and y coordinates position, assist the memory, and/or enlarge the space of action vectors.

Using images, screen graphics, audio signals, vibrations, and/or other inputs and actions, e.g., as described above, represents a mnemonic approach that may simplify recalling a secret by using one or more actions associated with a thought, a location, an idea, or an understanding of a concept familiar to the user as guidance to recalling the secret. The digital signature scheme may use a defined secret knowledge associated with an action, such as a touch screen motion, a device motion, a device position, timing, GPS information, and/or other location coordinates of the user. As described below, a user may choose one or more secret points or positions at or associated with an image, graphic, text, location, audio, and/or motion, and may then set up a series of actions to define digital signature schemes.

The digital signature scheme based on a mnemonic-aided secret may be used to authenticate a user with a system, such as a device, and provide higher levels of security with simpler inputs in comparison to using a type-in/voice based password scheme. The digital signature scheme may also be used, e.g., on a handheld device or other devices, where using a password scheme is not useful or practical, such as when the environment is not acoustically and/or visually friendly, or if the user is verbally or visually impaired. Different aspects of the digital signature scheme are described in detail below.

FIG. 1 illustrates embodiments of a plurality of digital signature schemes 100 based on a mnemonic-aided secret, which may be used to authenticate a user on a device 101. The device 101 may be any user operated device such as a handheld, personal, portable, or mobile device. Examples of the device 101 may include cellphones, smartphones, computer laptops (e.g., notebooks/netbooks), and computer tablets. The device may comprise one or multiple-axis input systems, e.g., having x, y, and z coordinates), such as a touch screen, an accelerometer, a gyroscopic sensor, or combinations thereof.

Typically, user authentication may be based on mechanisms to verify a user secret, such as what a user has (e.g., fingerprint), what a user knows (e.g., a password), or what a user can do (e.g., Completely Automated Public Turing test to tell Computers and Humans Apart (CAPTCHA)). Such mechanisms may have a plurality of disadvantages for user authentication, e.g., in terms of security and complexity, as described above. The user authentication may be improved, e.g., provide higher levels of security with relatively simpler inputs, using the digital signature schemes 100. Specifically, one or more mnemonic-aided secrets may be used to configure and use the digital signature schemes 100, e.g., for one or more corresponding users, to authenticate the user(s) and grant the user(s) access to the device 101 upon successful authentication.

The digital signature schemes 100 may comprise a combination of memorial, visual, motional, auditory, date, time, and/or location dependent secrets and actions. For instance, the authentication may be based on what a user knows, such as a position on a screen or a response to a tone or vibration, what action the user performs, such as a motion at a determined time of day or day of week, where the user is located, e.g., home or office, and/or how the user performs the action, e.g., how fast or before a timer expires.

The digital signature schemes 100 may comprise a first digital signature scheme or implementation 110 that may correspond for a user of the device 101. The user may define one or more secret points from a picture that may be displayed on the screen of the device 101. The picture may be any type of picture that may be captured by a camera (e.g., photograph), drawn by a drawing tool (drawing or graphic), or a combination of both. For instance, the picture may comprise one or more graphics that may or may not be related. The points may correspond to or coincide with portions of the picture (e.g., graphic points), such as a graphic of a keyboard (at the middle left side), a graphic of an eye (at the top left side), and a third point (at the top right edge). The user may also define an action associated with the defined points, which may be a motional action of linking the points by drawing a line on the touch screen between the three points. The order or sequence of linking the points may also be determined, e.g., to improve security, such as a line starting from the keyboard graphic, passing by the eye graphic, and reaching the third point. As such, the first digital signature scheme 110 may comprise both a defined secret and a corresponding action.

One or more mnemonic-aided secrets may allow the user to define the points and the corresponding action and to train the device memory to recognize the first digital signature scheme 110. Defining and training the first digital signature scheme 110 may use sensory/input data from the touch screen of the device 101. For example, after defining the first digital signature scheme 110, the user may implement the action of linking the three points on the touch screen, e.g., in an initial setup phase or practice mode, to allow the device memory to register the first digital signature scheme 110 and associated action. After the training process, the device may become capable of recognizing future attempts by the user for implementing the action, e.g., in authentication mode.

A second digital signature scheme or implementation 120 may be defined on the device 101, e.g., by the same user or another user. The user may define one or more actions associated with one or more points from the picture displayed on the screen of the device 101. The points and actions may comprise first connecting two graphic points on the picture by drawing a swirled line between the two points (e.g., at the top left side and the top right side). Next, a character (e.g., the "@" character) or any other drawing may be drawn or sketched at a third point of the picture (e.g., the keyboard graphic). Finally, a third sketch or drawing (e.g., a smiley face) may be made at a fourth point of the picture (e.g., at the bottom right side). The actions associated with the different points may be defined in the order described above. After defining the actions and points, the user may also train the device to recognize the second digital signature 120, e.g., using a practice or training mode. Defining and training the second digital signature scheme 120 may use sensory/input data from the touch screen of the device 101.

A third digital signature scheme or implementation 130 may be defined on the device 101, e.g., by the same user or another user. The user may define an action associated with a point from the picture displayed on the screen of the device 101. The third digital signature scheme 130 may be defined by pressing a finger at a determined point of the picture (e.g., on or around the keyboard graphic), and shaking the device 101 vertically about two times, e.g., while or after pressing the point. The process may be repeated as needed to train the device 101 to recognize the defined third digital signature scheme 130. Defining and training the third digital signature scheme 130 may use sensory/input data from the touch screen, accelerometer(s), and/or gyroscope(s) of the device 101. Similarly, a fourth digital signature scheme or implementation 140 may be defined on the device 101, e.g., by the same user or another user, by performing an action associated with a point from the picture. The fourth digital signature scheme 140 may be defined by tapping (e.g., with a finger) at a determined point of the picture (e.g., around the middle), stopping for a determined time (e.g., about one second) after tapping, tapping for a second time around the same point, stopping for a second determined time (e.g., about two seconds) after the second tap, and then tapping for a third time around the same point. As described above, the user may train the device 101 to recognize the defined fourth digital signature scheme 140. Defining and training the fourth digital signature scheme 140 may use sensory/input data from the touch screen and timer(s) of the device 101.

Figure 2:
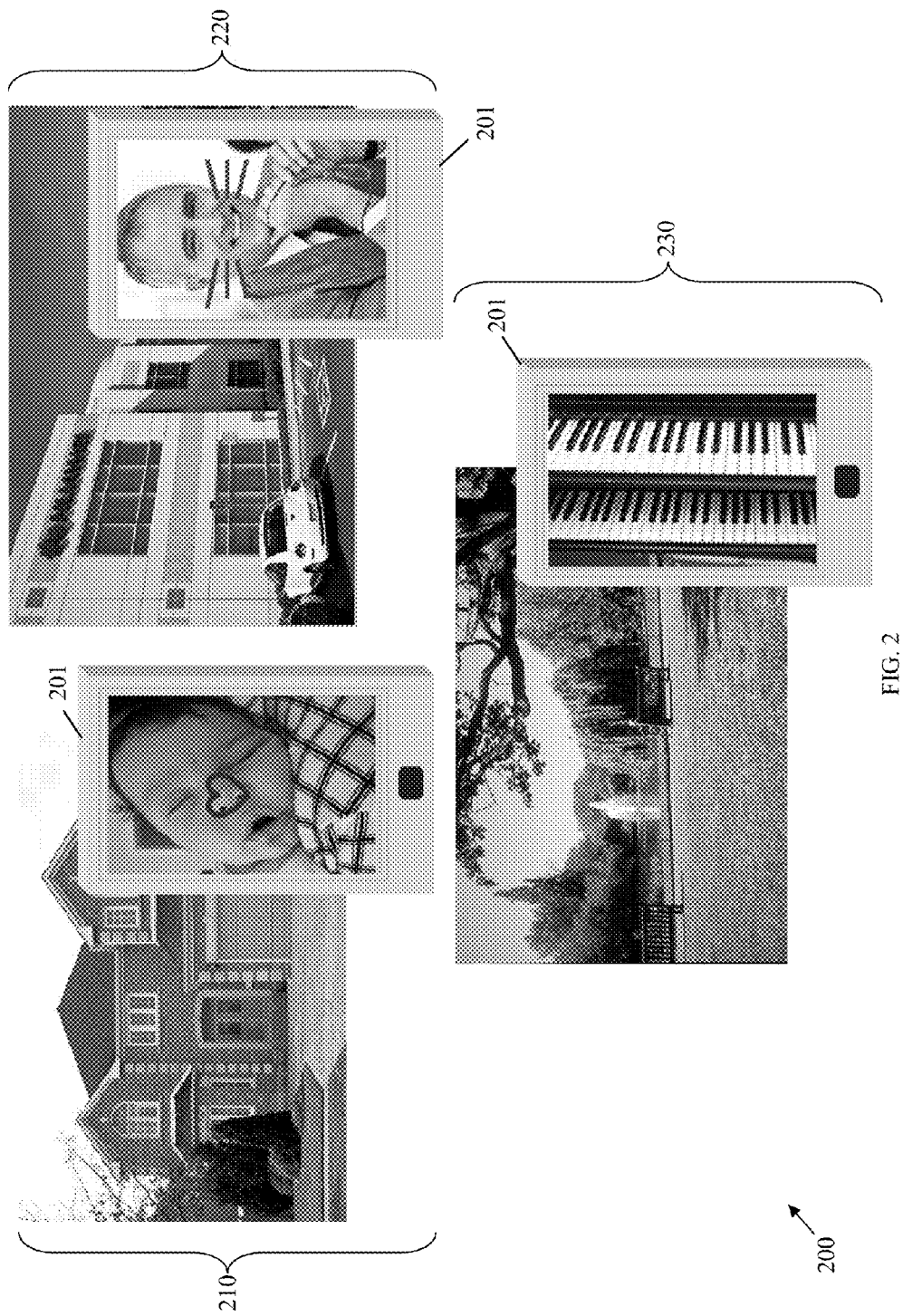
FIG. 2 is a schematic diagram of other embodiments of a plurality of digital signature schemes based on a mnemonic-aided secret.

FIG. 2 illustrates other embodiments of a plurality of digital signature schemes 200 based on a mnemonic-aided secret, which may be used to authenticate a user on a device 201. The device 201 may be similar to the device 100. The digital signature schemes 200 may be defined and used to authenticate the same user on the device 201 at different places and/or times. The digital signature schemes 200 may comprise a first digital signature scheme 210 for authenticating the user on the device 201. The first digital signature scheme 210 may be defined by the user by choosing a picture, such as a photograph of the user's child, and an action of drawing (on the touch screen) a sketch, e.g., of a heart, at a determined point of the picture, e.g., on or around the child's nose on the photograph. The first digital signature scheme 210 may also be associated with a defined location, such as the user home, where the first digital signature scheme 210 may be used for authentication. The location may be detected, for instance using a GPS system, cellular, or WiFi identification in the device 201. In some embodiments, the first digital signature scheme 210 may also be associated with a time, such as during night hours, where the first digital signature scheme 210 may be used for authentication, e.g., to improve security. The first digital signature scheme 210 may not be used at other times and locations to authenticate the user.

The first digital signature scheme 210 may change into a second digital signature scheme 220 for authenticating the user on the device 201 at a second location/time. The second digital signature scheme 220 may be defined by the user by choosing a second picture, such as a photograph of the user's manager, and an action of drawing (on the touch screen) a corresponding sketch, e.g., a plurality of lines or whiskers, on a determined point of the second picture, e.g., on or around the manager's nose on the photograph. The second digital signature scheme 220 may also be associated with a second defined location, such as the user office, where the second digital signature scheme 220 may be used for authentication. The second digital signature scheme 220 may also be associated with a corresponding time, such as during morning to evening hours, where the second digital signature scheme 220 may be used for authentication. The second digital signature scheme 220 may not be used at other times and locations to authenticate the user.

The first digital signature scheme 210 or the second digital signature scheme 220 may change into a third digital signature scheme 230 for authenticating the user on the device 201 at other locations/times. The third digital signature scheme 230 may be defined by the user by choosing a third picture, such as a photograph of a keyboard, and an action of tapping on the photograph. The third digital signature scheme 230 may be associated with a third defined location, such as outside the user home and office, where the third digital signature scheme 230 may be used for authentication. The third digital signature scheme 230 may also be associated with a corresponding time, such as during weekends, where the third digital signature scheme 230 may be used for authentication.

Other examples of digital signature schemes based on mnemonic-aided secrets may include sketching a heart on or around the child's nose when the user is located at home, sketching an "X" sign on the manager's forehead at the office sketching two hearts on the child's photograph outside the home and office, or combinations thereof. Another example of a digital signature scheme based on mnemonic-aided secrets may comprise choosing two secret points in an image, writing a determined Greek letter on one of the two points, and drawing a star on the other secret point. The secret points may also change according to time of day and/or location of the device. Another example of a digital signature scheme based on a mnemonic-aided secret may comprise displaying a keyboard and playing the keyboard (using the touch screen) with a selected or composed piece of music. In another defined digital signature scheme, the user may choose a secret point in an image or text on the screen, press and hold on the point, and shake the device twice vertically or in another defined manner. In yet another example, the user may tap the right upper corner of the touch screen three times and then sketch a triangle (using a finger) on the left corner of the screen.

In an embodiment, a digital signature scheme, e.g., any of the digital signature schemes described above, may be used along with one or more auditory triggers. For example, a heart may be sketched on the child's nose once a defined tone is heard from the device and/or before another defined tone is heard, which may include timing as part of the digital signature scheme. The user input may also be disabled until a tone is heard. In another embodiment, any of the digital signature schemes above or other digital signatures based on mnemonic-aided secrets may be used with one or more vibration triggers. For example, a heart may be sketched on the child's nose once a vibration of the device is felt, before a second vibration is felt, or both. In yet another embodiment, any of the digital signature schemes described may be used along with both auditory and vibration triggers. For example, a heart may be sketched on the child's nose once a vibration is felt, before an auditory tone is heard, or both.

In some embodiments, user authentication may be enabled using at least one of a kinetic and auditory mnemonic, where secrets, actions, and/or triggers may be based on kinetic and/or auditory procedures. Examples of kinetic or motion mnemonics may include rotation, translation, shaking, and/or other movements performed on a handheld device and used as input or action, vibrations performed on the device (e.g., via a vibrating mechanism) and used as output or cue, or both. Examples of auditory mnemonics may include sounds used as input or action on the device (e.g., via a microphone), sounds or tones used as output or cue (e.g., via a speaker), or both.

A digital signature scheme based on a mnemonic-aided secret may comprise any number of device input responses to one or more mnemonic cues, such as screen touches, device orientation changes, text input, biometric input, and/or other triggers. For instance, a defined motion signature may comprise a series of determined distinguishing feature actions that may serve to authenticate a device user. The actions may be defined by sensory data collected on spatial and/or temporal motions with secret locations or points on a touch screen. To identify touch screen locations, one or more mnemonics (e.g., one or more images) may be used to help users recall and localize their secrets, which may substantially increase the difficulty to break into the protected system/device. The size and precision of motion signatures may affect the security and ease of use of the system/device.

In an embodiment, a set of atomic motions may be used as part of the mnemonics to allow a user to locate positions, such as x and y coordinates, a touch screen of a device. The set of atomic motions may be defined (but are not limited to) using the following functions or code:

```
Tap (x-range, y-range)
Hold (x-range, y-range, time-length)
Line (x1-range, y1-range, x2-range, y2-range)
Circle (x0-range, y0-range, radius-range)
Triangle (x0-range, y0-range, edge-range)
Cross (x0-range, y0-range, line-range)
Symbol (Symbol, x0-range, y0-range, size-range)
```

The function Tap may correspond to a type of action where a user uses a fingertip to tap at a determined position on a touch screen. The x and y coordinates may be secrets only known to the user, and the tolerance ranges of x and y coordinates may be a result of the training data during the setup phase.

To improve the motor skill precision and help the user remember and find the correct positions on the screen, an image may be displayed on the touch screen. The image may comprise multiple objects (e.g., image portions) and each object may have multiple feature points that may be used to assist the user to find a secret position. For an example, in the picture used in the digital signatures 100 of FIG. 1, the left corner of an eye graphic, the handle tip of a lollipop graphic, and/or the fourth key of a keyboard graphic may be secret position candidates. The user may choose one or more image objects of interest as secret points and make the objects part of a signature motion series. If an assistive image is not desired, the user may choose some easy to remember locations on the screen, such as the right upper corner, the center, and the middle of the bottom line, as secret points.

The function Hold may correspond to a type of action where a hold duration or time is added to the Tap action. A user may choose the secret position, press on the position, and hold while pressing on the position for a hold time (e.g., for about few seconds) without releasing. The length of the hold time may be defined by the user during the setup of this motion signature. The function Line may correspond to a type of action that where a user presses a secret start point and draws (e.g., a line or curve) on the touch screen to a secret end point. The start and end points may or may not be image assisted (e.g., image objects). The function Circle may correspond to a type of action where a user uses a fingertip (or any part of a hand or body) to draw a circle on a touch screen. The center of the circle (e.g., determined by the coordinates x0 and y0) may be a secret point that may or may not be image assisted. The user may sketch a circle on or around any selected object or position of interest. The parameter radius-range may represent the allowed range of the radius of the circle drawn by the user.

The function Triangle may correspond to a type of action where the user uses a fingertip to draw a triangle on a touch screen. The center of the triangle (e.g., at the coordinates x0 and y0) may be a secret point that may or may not be image assisted. The user may draw a triangle on or around any object or position of interest. The function Cross may correspond to a type of action where a user uses a fingertip to draw a cross on a touch screen. The center of the cross (e.g., at the coordinates x0 and y0) may be a secret point that may or may not be image assisted. The user may sketch a cross on any object or position of interest. The function Symbol may correspond to a type of action where a user uses a fingertip to draw a symbol (or character) on a touch screen. The center of the symbol (e.g., at the coordinates x0 and y0) may be a secret point that may or may not be image assisted. The user may draw a symbol on any object or position of interest. The parameter size-range may represent the allowed range of the symbol size drawn by the user.

In another embodiment, another set of atomic motions may be used as part of the mnemonics.

---
Shake (axis, times)
Translation (axis, distance-range)
Spin (axis, degree-range)
Helical (axis, number of circles)
---

The set of atomic motions may be defined (but are not limited to) using the following functions or code: The function Shake may correspond to a type of action where a user holds the device and shakes it along a determined axis for a number of times. The axis and the number of times may be defined by the user when the user sets up a signature motion. The function Translation may correspond to a type of action where a user makes a uniform motion of a handheld device, e.g., in a straight line along a determined axis. The parameter distance-range may represent the allowed distance of moving. The function Spin may correspond to a type of action where a user spins the device along a determined axis. According to a wrist motion range and for the ease of use, the allowed degree range may be between about 0 to 180 degrees. The function Helical may correspond to a type of action where a user moves a device helically along a determined axis. The number of circles parameter may represent the allowed number of circles in the spiral motion.

In an embodiment, a series of defined actions and/or triggers (e.g., corresponding to $Index_1$ to $Index_m$, where m is an integer) may be selected by time, date, location, and/or other suitable variables. A digital signature may be defined by a series of actions that may be implemented using the following functions, motions, or combinations thereof.

---
| | |
|---|---|
| $Index_i$ | The index for signature i for a predefined time, date and location; i = 1, 2, 3, . . . |
| n | the number of sequential actions in a signature |
| $M_i$ | The mnemonic which help to assist memory for Action i |
| $A_i$ | a given user action and/or a set of simultaneous actions |
| $P_i$ | a time interval from the end of $A_i$ to the start of $A_{i+1}$. $P_1 = 0$ |
---

For instance, a signature ($Index_1$) may be defined by a series of actions, denoted as $Index_1 = (n, (M_1, A_1, P_1), (M_1, A_2, P_2), \ldots, (M_n, A_n, P_n))$. For example, a user may set a signature as a series of actions/triggers comprising holding the center of the eye graphic in the image of FIG. 1, and shaking the device along a determined axis (e.g., the x-axis) a number of determined times (e.g., twice) in a determined number of seconds (e.g., two seconds) after a tone is heard.

Figure 3:
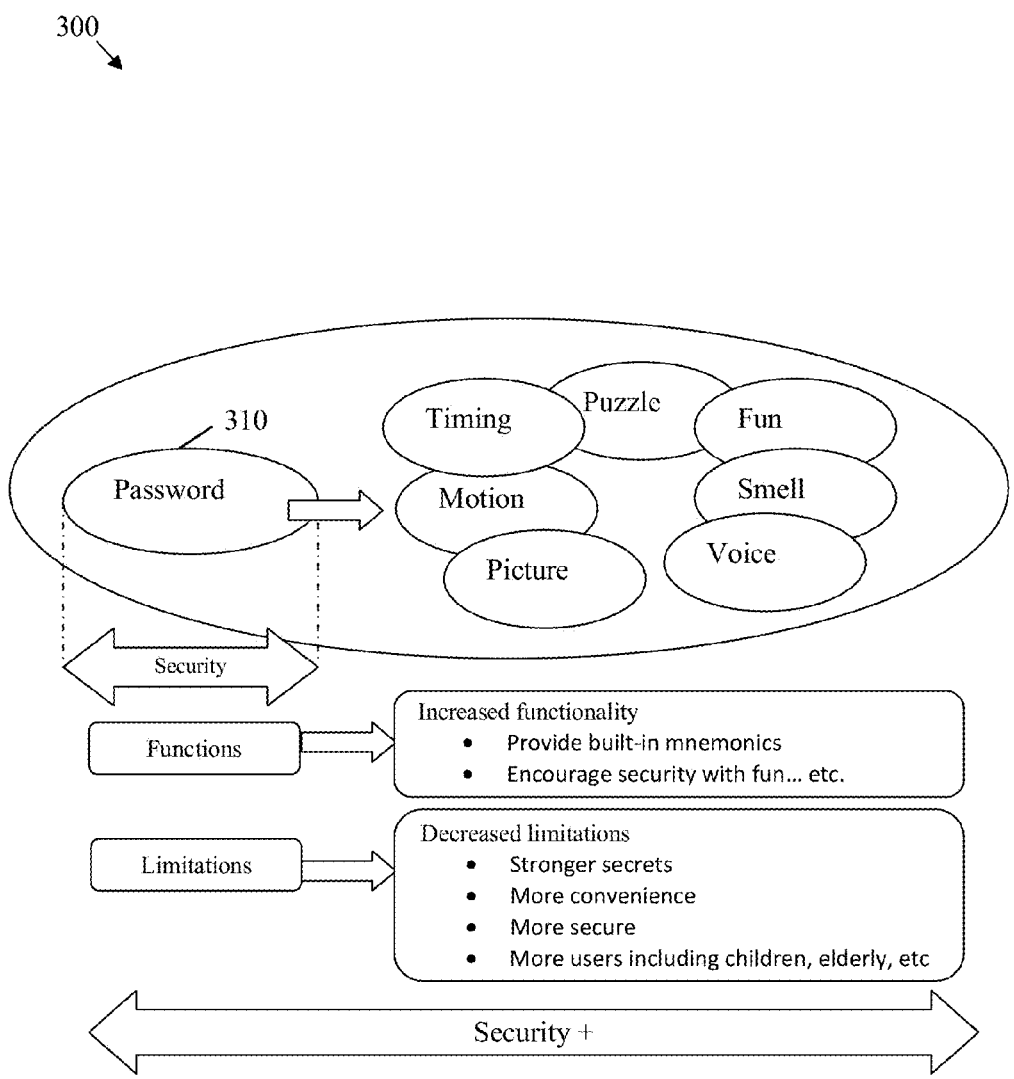
FIG. 3 is a schematic; diagram of an embodiment of advantages for a digital signature scheme based on a mnemonic-aided secret.

FIG. 3 illustrates an embodiment of advantages 300 for a digital signature scheme based on a mnemonic-aided secret, e.g., in comparison to a typical password based authentication scheme. The digital signature scheme may comprise a combination of secrets, actions, and triggers, as described above. For instance, in addition to a secret and/or a password, the mnemonics may be based on timing, motion, pictures, audio, puzzles/games, fun, smell and/or other actions and triggers. In comparison to using only a password or similar secret for authentication, the advantages 300 of using such combinations in the digital signature scheme for authentication may include increased functionality, decreased limitations, and improved security.

The increased functionality may include providing built-in mnemonics and encouraging security with fun to the user. The decreased limitations may include stronger secrets, more convenience, more security, and enabling more types of users to use authentication, such as children, elderly, and/or persons with disability. Additionally, the mnemonic assisted technology may decrease the need for traditional image-recognition techniques (e.g., CAPTCHA) to detect machine generated inputs. The improved security may include increased difficulty in breaking into the system or device. The advantages 300 may also include assisting the user to remember stronger or more difficult to remember secrets, relatively fast input of compound or complex secrets, making secrets harder to copy, describe, and/or steal. The secrets may also be configured to change with time, date, and/or location and may be language independent.

The digital signature scheme based on a mnemonic-aided secret may be used in a variety of applications. For example, the scheme may be used to authenticate a user to unlock a device, activate an application, access some data, lock/unlock a function, and/or to implement other procedures for user/device authentications and access authorization. In one embodiment, the scheme may enable an anti-theft application on a device, e.g., a cellphone or smartphone. For instance, the cellphone's user may activate the anti-theft application at a sub-way before sliding the cellphone in the user's pocket. If the cellphone is then snatched or pickpocketed from the user's pocket, e.g., by a pickpocket or a rubber, then the anti-theft application may be configured to trigger an alarm sound on the device.

The application may also be configured to identify the user and determine whether the user himself has removed the cellphone from his pocket. In this case, the application may not trigger the alarm on the phone. The digital signature scheme may be used to enable the application to identify the user and hence disable the alarm. For instance, the application may initiate a timer to allow the user to complete digital signature recognition and user authentication and hence deactivate the alarm. If the timer expires before successful authentication, the cellphone may be assumed stolen and the alarm may be triggered. To implement the digital signature scheme, the user may slide his hand inside the pocket and draw (using one or more fingers) a circle one the screen. Alternatively, the user may press one or more fingers on the screen to complete authenticate. Other more sophisticated motion signatures may also be used. In some embodiments, a Global Positioning System (GPS) on the cellphone may be used to combine location information with the scheme, which may further enhance security.

Figure 4:
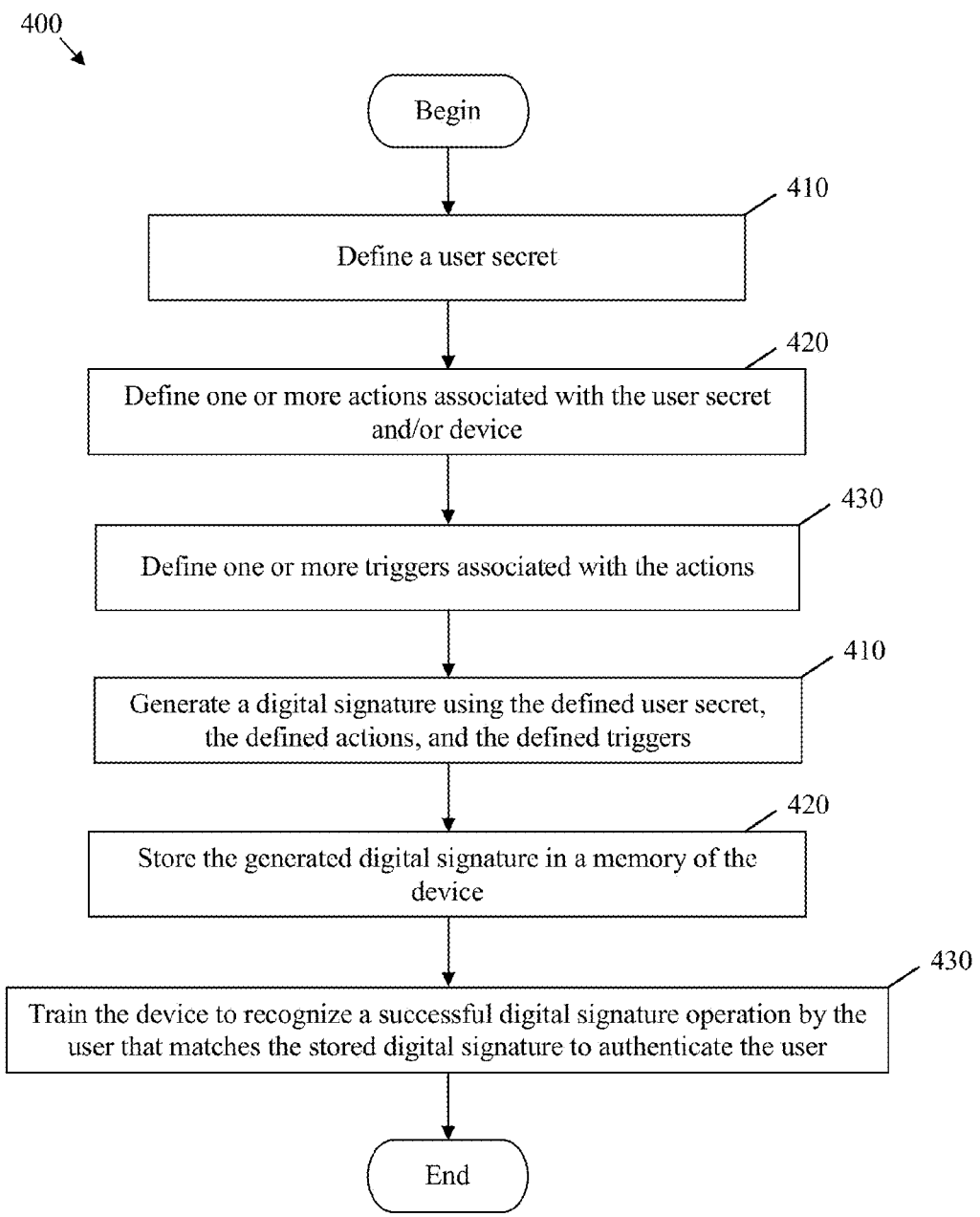
FIG. 4 is a flowchart of an embodiment of a method for configuring a digital signature scheme based on a mnemonic-aided secret.

FIG. 4 illustrates an embodiment of a method 400 for configuring a digital signature scheme based on a mnemonic-aided secret, which may be used to enable user authentication to a system or on a device, e.g., similar to the device 101 or 201. The method 400 may begin at block 410, where a user secret may be defined. For instance, the user may select a group of points on different locations on a touch screen. In case the secrets are assisted with an image or picture on the touch screen, the points may coincide with different portions of the image or picture. At block 420, one or more actions associated with the user secret and/or device may be defined. For example, the actions associated with the secret may include linking and/or tapping on secret points on the screen. The actions associated with the device may include rotating or shaking the device. At block 430, one or more triggers associated with the actions may be defined. The triggers may be motion, picture, audio, time, and/or location based or any other type of suitable triggers that may be implemented on the device. For example, the actions may be assisted by audio (e.g., tones) and/or video (e.g., flashing images) triggers that may indicate the location of actions, the number of implemented actions (e.g., clicks or taps), and/or the action timing required.

At block 440, a digital signature may be generated using the defined user secret, the defined actions, and the defined triggers. At block 450, the generated digital signature may be stored in a memory of the device. At block 460, the device may be trained to recognize a successful digital signature operation by the user that matches the stored digital signature to authenticate the user. The method 400 may then end. After defining the digital signature and the combinations of features above, the device may be trained by the user to learn and recognize the digital signature scheme steps. Once the device is capable of recognizing the defined digital signature, the user may implement the defined action in association with the defined secrets and trigger to authenticate with and hence access one or more device functionalities that may require authentication.

Figure 5:
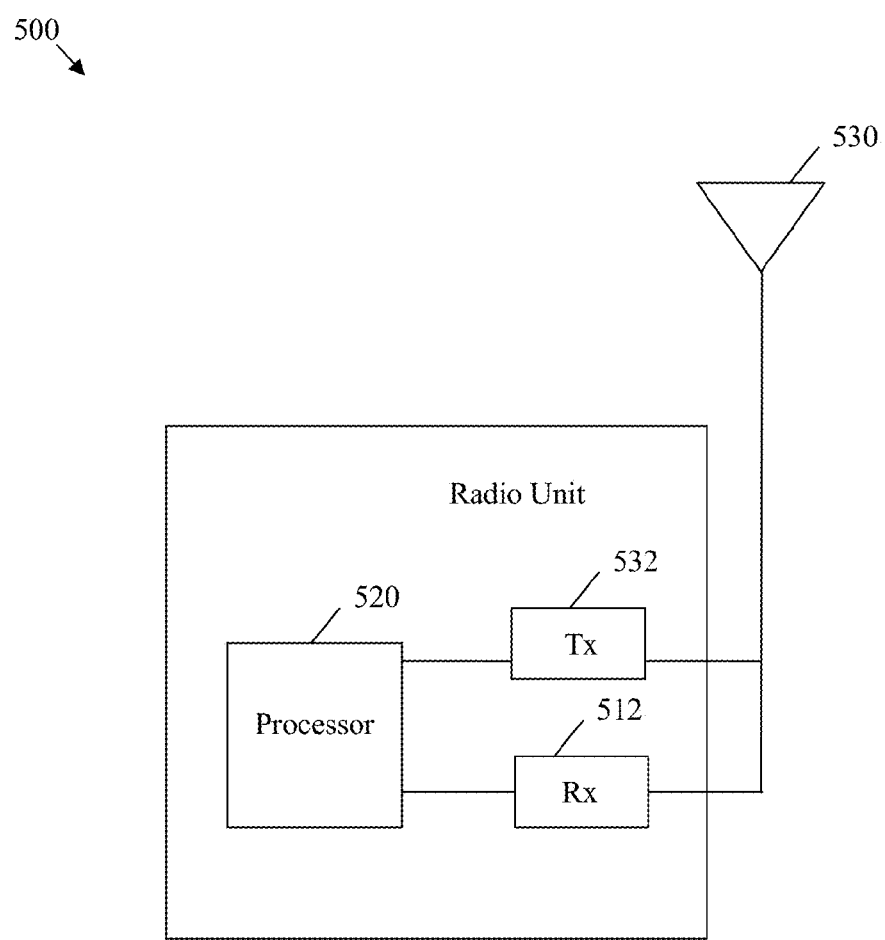
FIG. 5 is a schematic diagram of an embodiment of a mobile device component.

FIG. 5 illustrates an embodiment of a mobile device component 500, which may be any device that communicates data (e.g., packets) wirelessly with a network. For instance, the mobile device component 500 may be located in a mobile device (e.g., device 101 or 201) that exchanges or communicates data with networks or other mobile devices. The mobile device component 500 may comprise a receiver 512 (Rx), which may be configured for receiving data, packets, or frames from other components. The mobile device component 500 may comprise a logic unit or processor 520 coupled to the receiver 512, which may be configured to process the data and determine to which components the data is to be sent. The logic unit or processor 520 may also be configured to support or implement the method 400. The logic unit or processor 520 may be implemented using hardware, software, or both. The mobile device component 500 may also comprise a transmitter 532 (Tx) coupled to the logic unit or processor 520 and configured for transmitting data, packets, or frames to other components. The receiver 512 and transmitter 532 may be coupled to an antenna 530, which may be configured to receive and transmit wireless (radio) signals.

Figure 6:
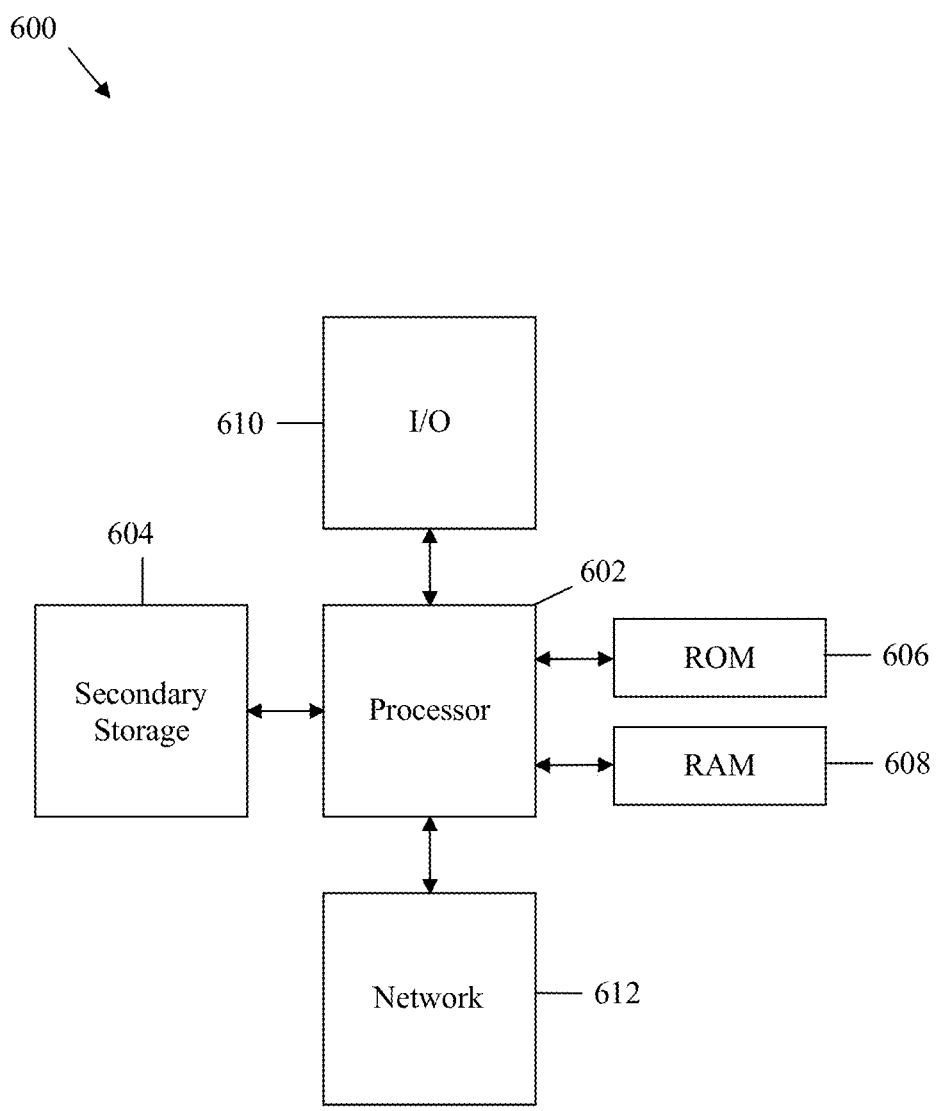
FIG. 6 is a schematic diagram of an embodiment of a general-purpose computer system.

The mobile device components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A user device comprising:
   a processor configured to:
      implement a digital signature scheme based on one or more mnemonic-aided secrets that authenticates a user, wherein the digital signature scheme comprises a first digital signature and a second digital signature;
      authenticate the user using the first digital signature at a first predefined time; and
      authenticate the user using the second digital signature at a second predefined time; and
   a device input system coupled to the processor and configured to detect a plurality of atomic motions implemented on the user device,
   wherein the mnemonic-aided secrets are sensory based mnemonics,
   wherein the first digital signature is a first combination of one or more secrets and one or more atomic motions associated with the secrets implemented on the user device,
   wherein the second digital signature is a second combination of one or more secrets and one or more atomic motions associated with the secrets implemented on the user device,
   wherein the digital signature scheme uses an image based mnemonic as one of the mnemonic-aided secrets to authenticate the user,
   wherein the device input system is a touch screen,
   wherein the image based mnemonic comprises an image displayed on the touch screen that includes one or more image objects that allows the user to remember the secrets,
   wherein the secrets correspond to one or more points that coincide with the image objects and an input order of the points,
   wherein the secrets comprise one or more locations on the image and one or more predefined time intervals that correspond to the atomic motions that coincide with the image objects, and
   wherein the image based mnemonic corresponds to a series of ordered atomic motions implemented with one or more predefined time intervals.

2. The user device of claim 1, wherein the digital signature scheme uses a kinetic based mnemonic as one of the mnemonic-aided secrets to authenticate the user, and wherein the kinetic based mnemonic corresponds to shaking the user device as one of the atomic motions.

3. The user device of claim 2, wherein shaking the user device corresponds to when a user holds the user device and shakes the user device along a determined axis for a number of times.

4. The user device of claim 1, wherein the digital signature scheme uses an auditory based mnemonic as one of the mnemonic-aided secrets to authenticate the user.

5. The user device of claim 1, wherein the secrets further comprise one or more points associated with at least one of the following: an image, a graphic, a text, a location, an audio, and a motion of the handheld device.

6. The user device of claim 1, wherein the first predefined time and the second predefined time are different, and wherein the first predefined time and the second predefined time reference different times of a day.

7. The user device of claim 1, wherein the processor is further configured to authenticate the user using the first digital signature based on a first predefined location of the user device and authenticate the user using the second digital signature based on a second predefined location of the user device.

8. The user device of claim 7, wherein the first predefined location and the second predefined location are determined using at least one of the following: a Global Positioning System (GPS) system identification, a cellular identification, and a Wireless Fidelity (WiFi) identification.

9. The user device of claim 1, wherein the processor is further configured to authenticate the user using the first digital signature based on a first predefined date and authenticate the user using the second digital signature based on a second predefined date.

10. The user device of claim 1, wherein the first digital signature is defined using an index parameter and a value that indicates a number of sequential atomic motion parameters within the index, wherein the index parameter is based on the first predefined time, a predefined date, and a predefined location, and wherein the index comprises a plurality of sequential atomic motion parameters.

11. The user device of claim 10, wherein each atomic motion field comprises a mnemonic parameter that indicates the mnemonic-aided secret for the atomic motion, an atomic motion parameter that indicates one of the atomic motions, and a time interval parameter that indicates a time interval from the end of the one of the atomic motions to the start of a next atomic motion.

12. An apparatus comprising:
   a processor configured to:
      implement a digital signature scheme based on one or more mnemonic-aids that authenticates a user, wherein the digital signature scheme comprises a plurality of signature indexes;
      authenticate the user using a first signature index at a first predefined location of the user;
      authenticate the user using a second signature index at a second predefined location of the user;
   a sensory input coupled to the processor, wherein the sensory input is configured to detect a plurality of user actions that correspond to the digital signature scheme; and
   a memory coupled to the processor, wherein the memory is configured to store input data that is used to recognize the digital signature scheme from the sensory input,
   wherein the first signature index and the second signature index each comprises a secret, a user motion associated with the secret and detected by the sensory input, and at least one of the mnemonic-aids,
   wherein the digital signature scheme uses an image based mnemonic as one of the mnemonic-aids to authenticate the user,
   wherein the sensory input is a touch screen,
   wherein the image based mnemonic comprises an image displayed on the touch screen that includes one or more image objects that allows the user to remember the secret, wherein the secrets correspond to one or more points that coincide with the image objects and an input order of the points, wherein the secrets comprise one or more locations on the image and one or more predefined time intervals that correspond to the user actions that coincide with the image objects, and wherein the image based mnemonic corresponds to a series of ordered user actions implemented with one or more predefined time intervals.

13. The apparatus of claim 12, wherein the secret is a determined point on the touch screen, and wherein the user motion associated with the secret is at least one of the following: a tap at the determined point, a hold at the determined point, and drawing a shape that crosses the determined point.

14. The apparatus of claim 12, wherein the apparatus is a handheld device, and wherein the user motion associated with the secret is at least one of the following: a shake motion, a translation motion, and a helical motion.

15. The apparatus of claim 14, wherein the shaking motion corresponds to a number of shakes of the apparatus along an axis, wherein the translation motion corresponds to a uniform motion of the apparatus for a predefined distance along the axis, and wherein the helical motion corresponds to moving the apparatus helically along the axis.

16. The apparatus of claim 12, wherein the processor is further configured to authenticate the user using the first signature index based on a first predefined date and authenticate the user using the second signature index based on a second predefined date.

17. The apparatus of claim 12, wherein the processor is further configured to authenticate the user using the first signature index based on a first predefined time of the user device and authenticate the user using the second signature index based on a second predefined time of the user device.

18. The apparatus of claim 12, wherein the first signature index further comprises a parameter value that references a number of sequential motions used by the first digital scheme to authenticate the user.

19. The apparatus of claim 18, wherein the first signature index further comprises a time interval parameter that indicates an end of one of the sequential motions and a start of another sequential motion.

20. The apparatus of claim 12, wherein the user motion indicates a user action detected by the sensory input, a set of simultaneous user actions detected by the sensory input, or both.

21. The apparatus of claim 12, wherein the mnemonic-aids are at least one of the following cues: a generated audio, an image displayed on the sensory input, a vibration motion, and a time in a day.

22. A method, comprising:
implementing a digital signature scheme to authenticate a user within a user device for one or more mnemonic-aided secrets that authenticates a user, wherein the digital signature scheme comprises a first digital signature and a second digital signature;

authenticating the user using the first digital signature at a first predefined time;

authenticating the user using the second digital signature at a second predefined time; and detecting a plurality of atomic motions implemented using the user device, wherein the mnemonic-aided secrets are sensory based mnemonics, wherein the first digital signature is a first combination of one or more secrets and one or more atomic motions associated with the secrets implemented on the user device, wherein the second digital signature is a second combination of one or more secrets and one or more atomic motions associated with the secrets implemented on the user device, wherein the digital signature scheme uses an image based mnemonic as one of the mnemonic-aided secrets to authenticate the user, wherein detecting the plurality of atomic motions is implemented on a touch screen, wherein the image based mnemonic comprises an image displayed on the touch screen that includes one or more image objects that allows the user to remember the secrets, wherein the secrets correspond to one or more points that coincide with the image objects and an input order of the points, wherein the secrets comprise one or more locations on the image and one or more predefined time intervals that corresponds to the atomic motions that coincide with the image objects, and wherein the image based mnemonic corresponds to a series of ordered atomic motions implemented with one or more predefined time intervals.

23. The method of claim 22, wherein the first digital signature is defined using an index parameter and a value that indicates a number of sequential atomic motion parameters within the index, wherein the index parameter is based on the first predefined time, a predefined date, and a predefined location, and wherein the index comprises a plurality of sequential atomic motion parameters.

24. The method of claim 22, further comprising authenticating the user using the first digital signature based on a first predefined location of the user device and authenticating the user using the second digital signature based on a second predefined location of the user device.

* * * * *

UNITED STATES PATENT AND TRADEMARK OFFICE
CERTIFICATE OF CORRECTION

PATENT NO.         : 8,769,669 B2
APPLICATION NO.    : 13/366011
DATED              : July 1, 2014
INVENTOR(S)        : Zhengyi Li et al.

Page 1 of 1

It is certified that error appears in the above-identified patent and that said Letters Patent is hereby corrected as shown below:

In the Claims

Column 16, Lines 1-39, Claim 22 should read:
A method, comprising:
implementing a digital signature scheme to authenticate a user within a user device for one or more mnemonic-aided secrets that authenticates a user, wherein the digital signature scheme comprises a first digital signature and a second digital signature;
authenticating the user using the first digital signature at a first predefined time;
authenticating the user using the second digital signature at a second predefined time; and
detecting a plurality of atomic motions implemented using the user device,
wherein the mnemonic-aided secrets are sensory based mnemonics,
wherein the first digital signature is a first combination of one or more secrets and one or more atomic motions associated with the secrets implemented on the user device,
wherein the second digital signature is a second combination of one or more secrets and one or more atomic motions associated with the secrets implemented on the user device,
wherein the digital signature scheme uses an image based mnemonic as one of the mnemonic-aided secrets to authenticate the user, wherein detecting the plurality of atomic motions is implemented on a touch screen,
wherein the image based mnemonic comprises an image displayed on the touch screen that includes one or more image objects that allows the user to remember the secrets,
wherein the secrets correspond to one or more points that coincide with the image objects and an input order of the points,
wherein the secrets comprise one or more locations on the image and one or more predefined time intervals that correspond to the atomic motions that coincide with the image objects, and
wherein the image based mnemonic corresponds to a series of ordered atomic motions implemented with one or more predefined time intervals.

Signed and Sealed this
Twenty-eighth Day of October, 2014

Michelle K. Lee
*Deputy Director of the United States Patent and Trademark Office*